(12) United States Patent
Yuzawa et al.

(10) Patent No.: US 9,726,213 B2
(45) Date of Patent: Aug. 8, 2017

(54) HOLLOW BOARD (71) Applicants: MEIWA INDUSTRY CO., LTD., Atsugi-shi, Kanagawa (JP); Iwata Bolt CO., LTD., Shinagawa-ku, Tokyo (JP)

(72) Inventors: Shun Yuzawa, Shimoina-gun (JP); Akinori Yazaki, Chikuma (JP); Fumiyasu Nishikawa, Sakai (JP)

(73) Assignees: MEIWA INDUSTRY CO., LTD., Atsugi-shi (JP); Iwata Bolt CO., LTD., Tokyo (JP)

( * ) Notice: Subject to any disclaimer, the term of this patent is extended or adjusted under 35 U.S.C. 154(b) by 185 days.

(21) Appl. No.: 14/680,478

(22) Filed: Apr. 7, 2015

(65) Prior Publication Data
US 2015/0308480 A1 Oct. 29, 2015

(30) Foreign Application Priority Data
Apr. 24, 2014 (JP) .................................. 2014-089776

(51) Int. Cl.
F16B 19/10 (2006.01)
F16B 5/04 (2006.01)

(52) U.S. Cl.
CPC ............ F16B 19/1054 (2013.01); F16B 5/04 (2013.01)

(58) Field of Classification Search
CPC ..... F16B 19/1054; F16B 5/04; F16B 19/1045
USPC ................................................ 411/43, 54, 34
See application file for complete search history.

(56) References Cited

U.S. PATENT DOCUMENTS

| 2,885,798 | A | * | 5/1959 | Palmer | A43B 21/42 36/34 R |
|---|---|---|---|---|---|
| 3,671,061 | A | * | 6/1972 | Dawdy | E04F 13/0812 411/30 |
| 4,074,608 | A | * | 2/1978 | Siebol | F16B 19/1054 411/43 |
| 4,138,779 | A | * | 2/1979 | Weber | B25C 1/047 29/243.517 |
| 4,909,687 | A | * | 3/1990 | Bradley | F16B 19/1054 411/43 |
| 6,138,419 | A | * | 10/2000 | Sekiguchi | B21J 15/02 29/525.13 |
| 6,299,398 | B1 | * | 10/2001 | Shinjo | F16B 19/1036 411/42 |
| 8,218,326 | B2 | * | 7/2012 | Lewis | F16B 5/04 29/524.1 |
| 8,430,613 | B2 | | 4/2013 | Ohkubo et al. | |
| 2005/0152762 | A1 | * | 7/2005 | Jones | F16B 19/1054 411/43 |
| 2005/0180837 | A1 | * | 8/2005 | Matsunaga | F16B 19/1054 411/43 |

(Continued)

FOREIGN PATENT DOCUMENTS

JP 2011-157996 A 8/2011

Primary Examiner — Flemming Saether
(74) Attorney, Agent, or Firm — Robert L. Scott; DC Patent Lawyers, PLLC (57) ABSTRACT

Tips of sections in a spreading state come into contact with vertical wall portions of a middle member at positions between a first plate-like member and center portions of the vertical wall portions in the thickness direction. Then, the sections break through the vertical wall portions, and are fastened to a hollow laminated board. Thus, a mounting bracket is attached to the hollow laminated board. This makes it possible to obtain a deck board with a small recessed portion formed in a top face.

1 Claim, 6 Drawing Sheets

(56) References Cited

U.S. PATENT DOCUMENTS

2015/0037600 A1\* 2/2015 Hofer ...................... B21J 15/02
428/586

\* cited by examiner

HOLLOW BOARD

CROSS REFERENCE TO RELATED APPLICATION

This application is based upon and claims the benefit of priority from the prior Japanese Patent Application No. 2014-089776, filed on Apr. 24, 2014, the entire contents of which are incorporated herein by reference.

BACKGROUND

1. Technical Field

The present invention relates to a hollow board.

2. Related Art

As disclosed in Japanese Patent Application Publication No. 2011-157996, a technology is known in which a mounting member is attached to a hollow board made of a resin by using a blind rivet.

The blind rivet includes a mandrel and a rivet main body. The mandrel has a head portion and a shaft portion extending like a rod. The rivet main body includes a disk-shaped flange and a tubular sleeve, and is inserted and held in the mandrel.

SUMMARY

A procedure for attaching a mounting member to a hollow board made of a resin by using the blind rivet is briefly described. First, the sleeve of the rivet main body of the blind rivet is inserted into rivet holes of the hollow board and the mounting member. Next, the mandrel is pulled to the shaft portion side. As a result, the head portion tears the sleeve of the rivet main body into sections. These sections spread outward in the radial direction like petals, break through vertical wall portions of the hollow board, and are fastened to the hollow board. Thus, the mounting member can be attached to the hollow board.

However, in the attachment of a mounting member to a hollow board made of a resin by using the blind rivet, a recessed portion is formed in a surface of the hollow board because a surface member of the hollow board is pulled in when the sections of the rivet main body break through the vertical wall portions of the hollow board. This recessed portion may deteriorate the appearance of the hollow board.

In this respect, an object of the present invention is to provide a hollow board made of a resin in which a mounting member is attached to the hollow board using a blind rivet and the deterioration in appearance is prevented.

A hollow board according to the present invention includes a hollow laminated board having a hollow portion therein, a mounting member attached to one of a top face side and a bottom face side of the hollow laminated board, and a rivet main body which fastens and attaches the mounting member to a face on the one side of the hollow laminated board.

The hollow laminated board includes a tabular first plate-like member arranged on the one side, a tabular second plate-like member arranged on the other side with a space provided between the first plate-like member and the second plate-like member in a thickness direction of the hollow laminated board, and a middle member which is arranged between the first plate-like member and the second plate-like member to connect the first plate-like member and the second plate-like member to each other and which has vertical wall portions extending in the thickness direction of the hollow laminated board and forming the hollow portion.

The rivet main body is formed in a tubular shape having a mandrel insertion hole extending in an axial direction, and includes a flange extending in a radial direction and a tubular sleeve extending from the flange in the axial direction.

A blind rivet is formed by the rivet main body and a mandrel inserted and held in the mandrel insertion hole of the rivet main body. The mandrel includes a shaft portion which extends like a rod and which has an easily breakable portion having a locally reduced diameter and being provided at a certain midpoint in the axial direction within the shaft portion, a head portion provided at a tip side of the shaft portion and formed to have a larger diameter than the mandrel insertion hole, and a protruding portion protruding from the head portion to a tip side of the mandrel by a predetermined length.

A rivet hole which is larger than a diameter of the sleeve of the rivet main body but smaller than a diameter of the flange is formed through each of the face on the one side of the hollow laminated board and the mounting member.

The sleeve of the rivet main body of the blind rivet is inserted into the rivet holes of the face on the one side of the hollow laminated board and the mounting member. A tip face of the protruding portion of the mandrel is brought into contact with an inside of the face on the other side of the hollow laminated board. Pulling the mandrel in this state to the shaft portion side causes the head portion to tear the sleeve of the rivet main body into sections and these sections to spread outward in the radial direction like petals. During the spreading, tips of the sections break through the vertical wall portions of the middle member at positions between the first plate-like member and center portions of the vertical wall portions in the thickness direction, and are fastened to the hollow laminated board.

In the hollow board according to the present invention, the tips of the sections come into contact with the vertical wall portions of the middle member at the positions between the first plate-like member and the center portions of the vertical wall portions in the thickness direction during the spreading. After that, the sections break through the vertical wall portions, and are fastened to the hollow laminated board.

Here, when the sections break through the vertical wall portions and are fastened to the hollow laminated board, the second plate-like member and the surface member are pulled in toward the first plate-like member. However, during the spreading, the sections break through the vertical wall portions at the positions between the first plate-like member and the center portions of the vertical wall portions in the height direction. Hence, the amount of the pulling-in of the second plate-like member decreases, so that the deterioration in appearance is reduced.

DETAILED DESCRIPTION

Hereinafter, an embodiment of the present invention will be described in detail on the basis of the drawings.

Figure 1:
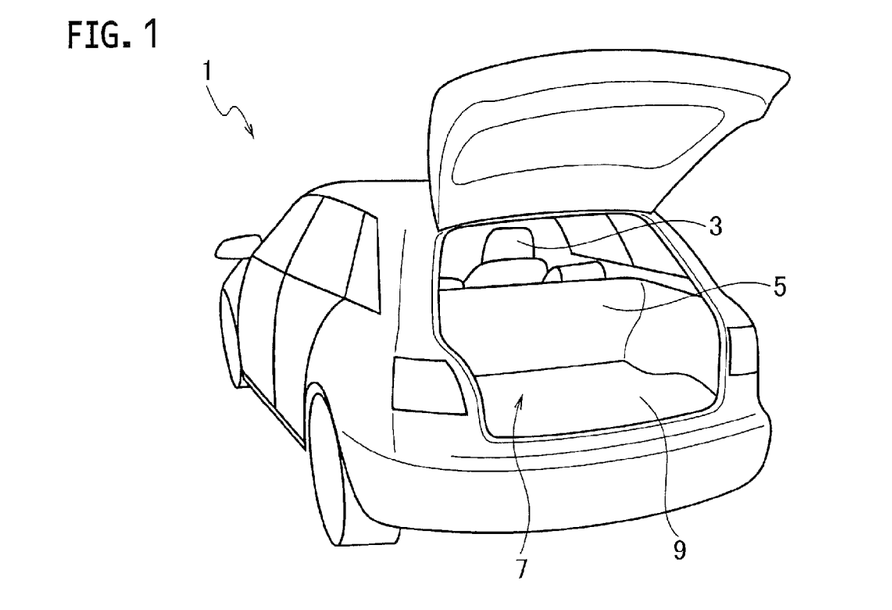
FIG. 1 is a perspective rear view of a rear portion of a vehicle in which a hollow board according to an embodiment of the present invention is disposed.
Figure 2:
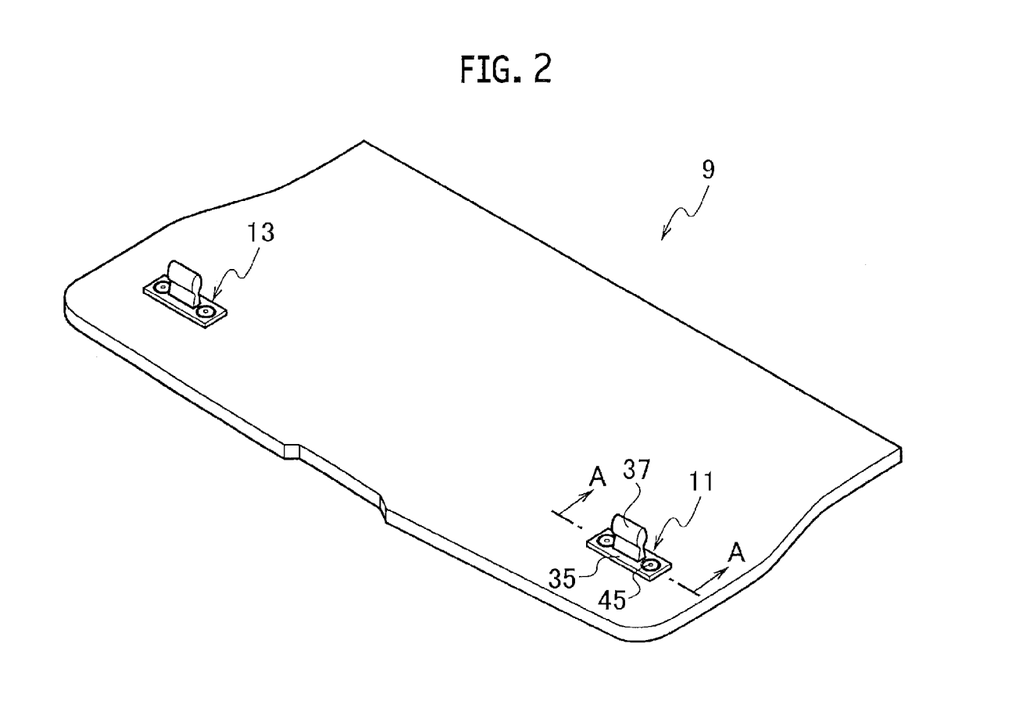
FIG. 2 is a perspective view of the hollow board of FIG. 1, in which a bottom face is arranged on an upper side.

As shown in FIG. 1, a front seat 3 and a rear seat 5 are disposed in an interior of a vehicle 1 according to this embodiment. A trunk room 7 is provided behind the rear seat 5. A housing recessed portion (not shown) for housing a spare tire, tools, and the like is provided on a floor of the trunk room 7. A deck board (hollow board) 9 is provided to cover an upper opening of the housing recessed portion. As shown in FIG. 2, the deck board 9 is formed in a substantially rectangular shape in a plan view, and includes plate-like members made of resin as described later. Note that, in FIG. 2 and later, the deck board 9 is shown upside down with a bottom face arranged on an upper side, and a top face arranged on a lower side.

Figure 3:
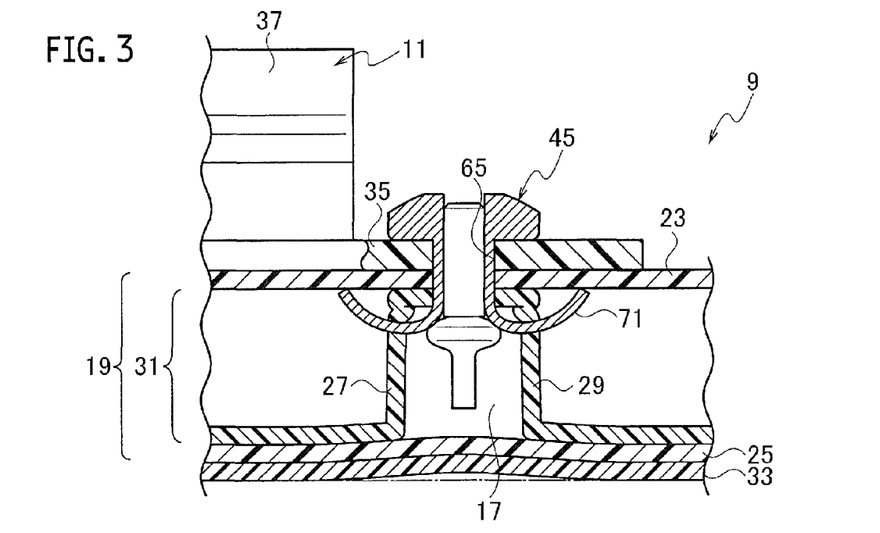
FIG. 3 is a cross-sectional view taken along line A-A of FIG. 2.

As shown in FIG. 2, mounting brackets (mounting members) 11 and 13 are fastened by rivet main bodies 45 to the bottom face of the deck board (hollow board) 9 according to this embodiment at both ends in a vehicle width direction. Specifically, as shown in FIGS. 2 and 3, the deck board 9 includes a hollow laminated board 19 having a hollow portion 17 therein, the mounting bracket 11 attached to the bottom face of the hollow laminated board 19, and the rivet main body 45 which fastens and attaches the mounting bracket 11 to the bottom face of the hollow laminated board 19. Note that, a tip of a broken mandrel 43 is fitted into the rivet main body 45.

The hollow laminated board 19 includes a tabular first plate-like member 23 arranged at the bottom face, a tabular second plate-like member 25 arranged on the top side with a space provided between the first plate-like member 23 and the second plate-like member 25 in a thickness direction of the hollow laminated board 19, a middle member 31 which is arranged between the first plate-like member 23 and the second plate-like member 25 to connect the first plate-like member 23 and the second plate-like member 25 to each other and which has vertical wall portions 27 and 29 extending in the thickness direction of the hollow laminated board 19 and forming the hollow portion 17, and a surface member 33 joined to the top side of the second plate-like member 25.

Note that the first plate-like member 23, the second plate-like member 25, and the middle member 31 are preferably made of resin. Preferred specific examples of the materials include polyolefin-based resins such as low-density polyethylene, high-density polyethylene, linear low-density polyethylene, homo polypropylene, random polypropylene, and block polypropylene, copolymers made from monomers of any ones of these polyolefin-based resins, copolymers made from a monomer of any ones of these polyolefin-based resins with another monomer, polyvinyl chloride, chlorinated polyvinyl chloride, ABS, AAS, AES, polystyrene, polyethylene terephthalate, polycarbonate, polyamide, polyvinylidene fluoride, polyphenylene sulfide, polysulfone, polyether ketone, copolymers made from comonomers thereof or made from a comonomer thereof with another monomer, and the like. These materials may be used alone or in combination. As described above, various thermoplastic resins can be used, and polypropylene-based resins are preferable, considering the balance between the costs and characteristics such as moldability, physical properties, low-temperature resistance, and heat resistance.

In addition, as shown in FIGS. 2 and 3, the mounting bracket 11 is formed monolithically from a tabular main body portion 35 formed in a rectangular shape in a plan view and a locking portion 37 standing from a center portion of the main body portion 35 in the vehicle width direction.

Figure 4:
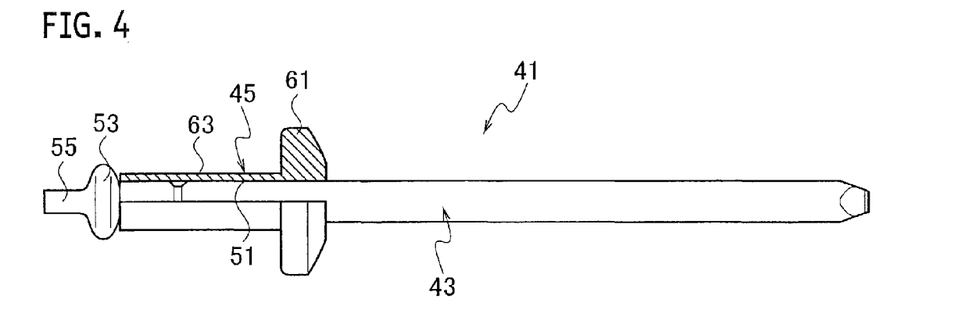
FIG. 4 is a side view showing a blind rivet according to the embodiment of the present invention.
Figure 5:
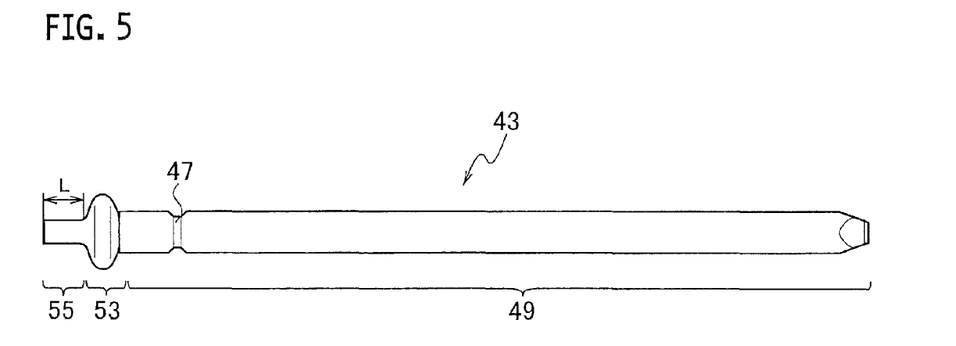
FIG. 5 is a side view showing a mandrel constituting the blind rivet of FIG. 4.

As shown in FIGS. 4 and 5, a blind rivet 41 includes the mandrel 43 and the rivet main body 45.

The mandrel 43 has a shaft portion 49 which extends like a rod (like a straight line in a side view) and which has an easily breakable portion 47 having a locally reduced diameter and being provided at a certain midpoint in the axial direction within the shaft portion 49, a head portion 53 provided at a tip side of the shaft portion 49 and formed to have a larger diameter than a mandrel insertion hole 51 of the rivet main body 45, and a protruding portion 55 protruding from the head portion 53 on a tip side of the mandrel 43 by a predetermined length. The protruding portion 55 is formed in a cylindrical shape extending in a central axis direction of the mandrel 43. Note that a length of the protruding portion 55 is set to L.

The rivet main body 45 includes a disk-shaped flange 61 extending in a radial direction and a tubular sleeve 63 extending from the flange 61 in a central axis direction. In addition, the mandrel insertion hole 51, which is cylindrical and which extends in the central axis direction, is formed in the flange 61 and the sleeve 63. The shaft portion 49 of the mandrel 43 is inserted and held in the mandrel insertion hole 51. Note that, as shown in FIG. 3, a rivet hole 65 is formed through the main body portion 35, the first plate-like member 23, and the middle member 31 of the mounting bracket 11. The rivet hole 65 has a diameter which is set larger than the diameter of the sleeve 63 of the rivet main body 45 but smaller than the diameter of the flange 61. Moreover, a material of the rivet main body 45 is not limited to aluminum, iron, and resins, but various materials can be used.

Subsequently, a procedure for fastening the mounting bracket 11 to the deck board 9 according to this embodiment is described.

Figure 6:
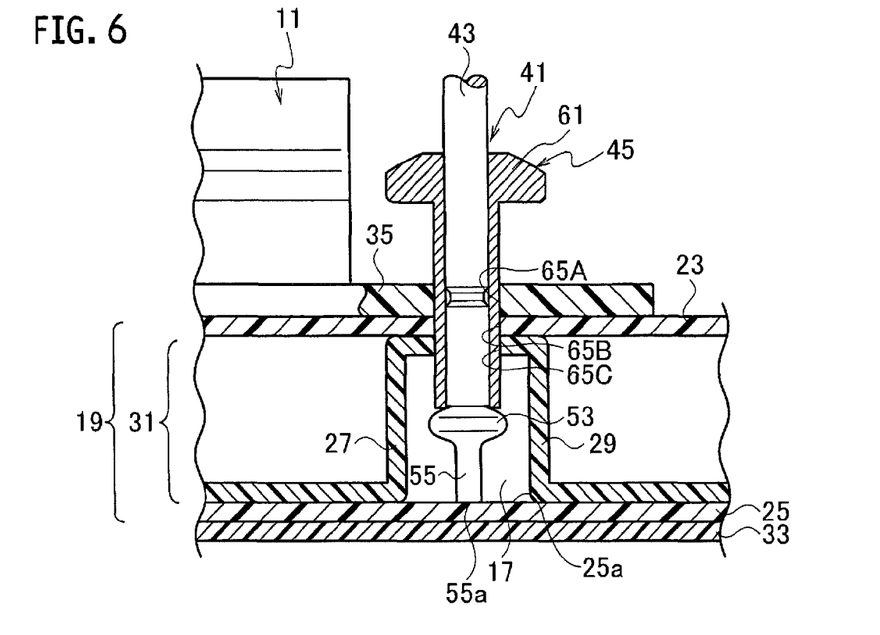
FIG. 6 is a cross-sectional view showing a state where a blind rivet according to an example of the present invention is inserted into rivet holes of a mounting bracket and a hollow laminated board.

First, an example of the present invention is described. As shown in FIG. 6, a rivet hole 65A formed in the main body portion 35 of the mounting bracket 11 is aligned with rivet holes 65B and 65C formed in the first plate-like member 23 and the middle member 31. In this state, the sleeve 63 of the rivet main body 45 of the blind rivet 41 is inserted into all of the rivet holes 65A to 65C, and a tip face 55a of the protruding portion 55 of the mandrel 43 is brought into contact with an inner face 25a of the second plate-like member 25.

Figure 7:
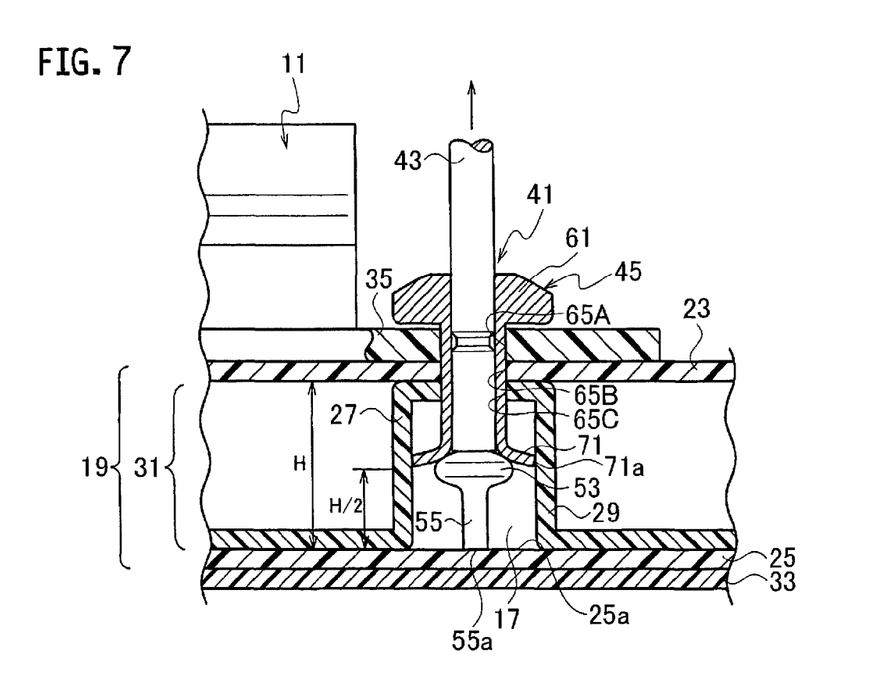
FIG. 7 is a cross-sectional view showing a state where a mandrel in the state shown in FIG. 6 is pulled up.

Then, the mandrel 43 in this state is pulled to the shaft portion side (to the upper side in FIGS. 6 and 7). Consequently, as shown in FIG. 7, the rivet main body 45 is lowered, and the flange 61 comes into contact with the main body portion 35 of the mounting bracket 11. The head portion 53 tears the sleeve 63 of the rivet main body 45 into sections 71. These sections 71 spread outward in the radial direction like petals, and come into contact with the vertical wall portions 27 and 29 of the middle member 31. Here, tips 71a of the sections 71 come into contact with the vertical wall portions 27 and 29 of the middle member 31 above (on the bottom face side of) a center H/2 of a height H of the vertical wall portions 27 and 29.

Figure 8:
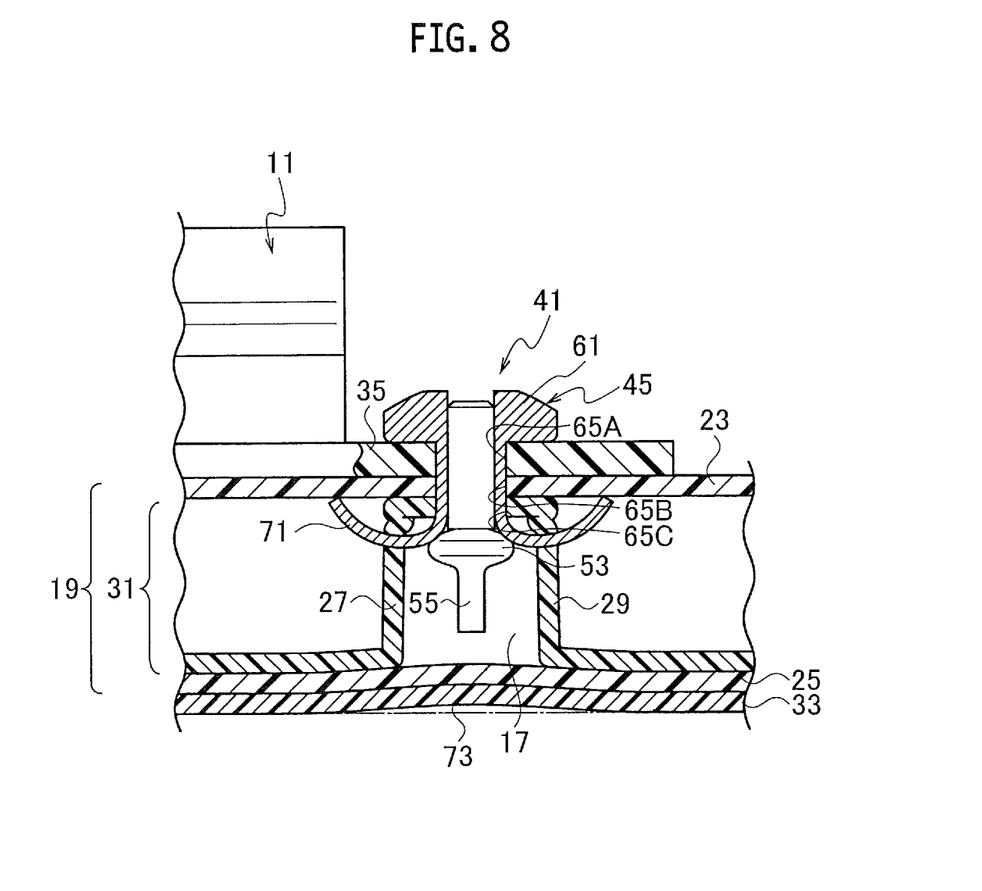
FIG. 8 is a cross-sectional view showing a state where a sleeve of a rivet main body is torn into sections and spread, so that tips of the sections break through vertical wall portions of a hollow laminated board to achieve fastening.

As the mandrel 43 is further pulled up to the shaft portion side as shown in FIG. 8, the tips 71a of the sections 71 break through the vertical wall portions 27 and 29 of the middle member 31 at positions between the first plate-like member 23 and a center in the height direction of the vertical wall portions 27 and 29 (i.e., at positions on the bottom side) during the spreading, and greatly protrude outward from the vertical wall portions 27 and 29. Here, the mandrel 43 is cut at the easily breakable portion 47. Thus, the mounting bracket 11 is fastened to the hollow laminated board 19 by the rivet main body 45. Note that, since the sections 71 of the sleeve 63 break through the vertical wall portions 27 and 29 of the middle member 31 as shown in FIG. 8, a recessed portion 73 slightly recessed toward the first plate-like member 23 (to the bottom side) is formed at portions of the surface member 33 and the second plate-like member 25 corresponding to the rivet main body 45. In addition, as shown in FIG. 8, the tips 71a of the sections 71 of the sleeve 63 are held, while being in contact with the first plate-like member 23.

Figure 9:
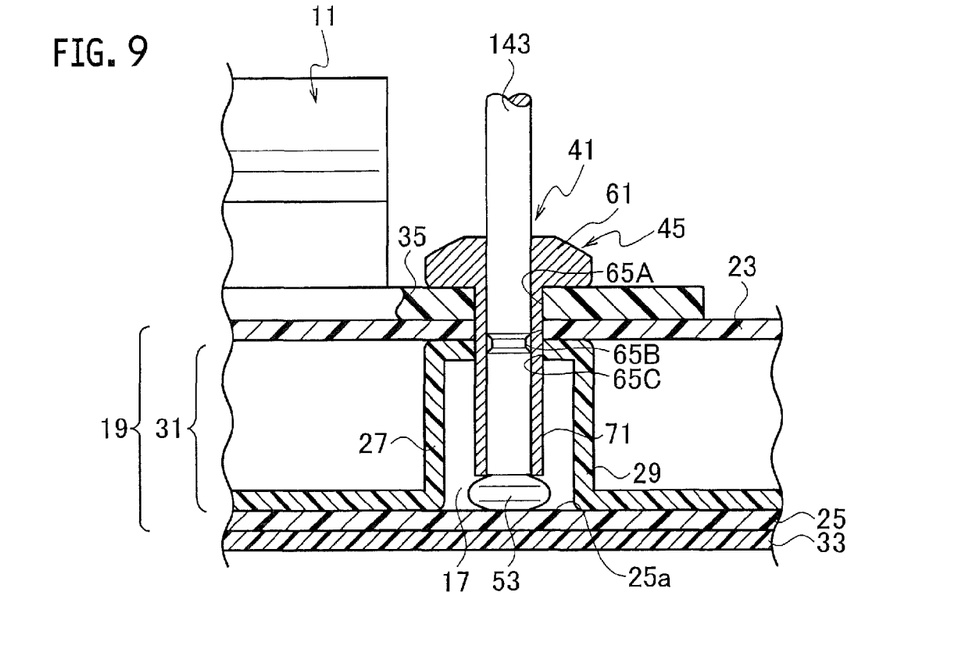
FIG. 9 is a cross-sectional view showing a state where a blind rivet according to a comparative example is inserted into rivet holes of a mounting bracket and a hollow laminated board.

Next, a comparative example is described. As shown in FIG. 9, a mandrel 143 is not provided with the protruding portion 55 in this comparative example. The rivet hole 65A formed in the main body portion 35 of the mounting bracket 11 is aligned with the rivet holes 65B and 65C formed in the first plate-like member 23 and the middle member 31. In this state, the sleeve 63 of the rivet main body 45 of the blind rivet 41 is inserted into all of the rivet holes 65A to 65C, and the flange 61 of the rivet main body 45 is brought into contact with the main body portion 35 of the mounting bracket 11. Note that, in this state, a tip face of the head portion 53 of the mandrel 143 also comes into contact with the inner face 25a of the second plate-like member 25.

Then, pulling the mandrel 143 in this state to the shaft portion side (to the upper side in FIGS. 9 and 10) causes the head portion 53 to tear the sleeve 63 of the rivet main body 45 into the sections 71. These sections 71 spread outward in the radial direction like petals, and come into contact with the vertical wall portions 27 and 29 of the middle member 31. Here, the tips 71a of the sections 71 come into contact with the vertical wall portions 27 and 29 of the middle member 31 below the center of the height of the vertical wall portions 27 and 29 (i.e., on the top face side).

Figure 11:
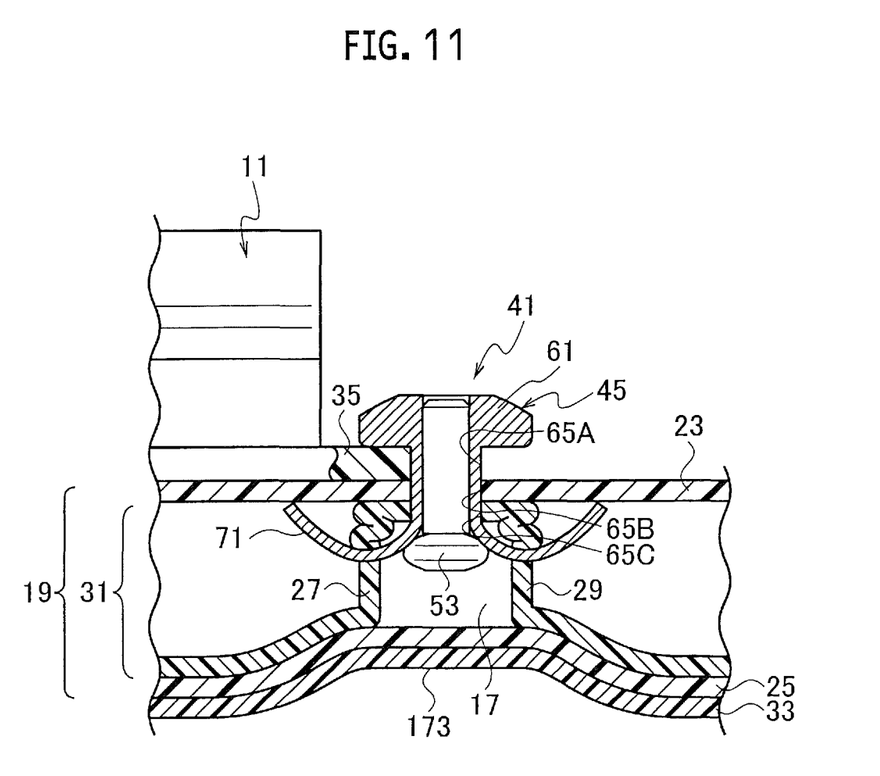
FIG. 11 is a cross-sectional view showing a state where a sleeve of a rivet main body is torn into sections and is spread, so that tips of the sections break through vertical wall portions of a hollow laminated board.

As the mandrel 143 is further pulled up to the shaft portion side as shown in FIG. 11, the tips 71a of the sections 71 break through the vertical wall portions 27 and 29 of the middle member 31 at positions between the second plate-like member 25 and the center in the height direction of the vertical wall portions 27 and 29 (i.e., at positions on the top side) during the spreading, and greatly protrude outward from the vertical wall portions 27 and 29. Here, the mandrel 143 is cut at the easily breakable portion 47. Thus, the mounting bracket 11 is fastened to the hollow laminated board 19 by the rivet main body 45. Note that since the sections 71 of the sleeve 63 break through the vertical wall portions 27 and 29 of the middle member 31 as shown in FIG. 11, a recessed portion 173 recessed toward the first plate-like member 23 (to the bottom side) is formed at portions of the surface member 33 and the second plate-like member 25 corresponding to the rivet main body 45. The recessed portion 173 has a larger depth from the surface of the surface member 33 than the recessed portion 73 in FIG. 8.

Accordingly, as is apparent from a comparison between FIGS. 8 and 11, the example of the present invention achieves better appearance than the comparative example, because the depth of the recessed portion 73 formed in the surface of the surface member 33 in the example of the present invention is smaller than that in the comparative example.

Operations and effects of this embodiment are described below.

The deck board (hollow board) 9 according to this embodiment includes the hollow laminated board 19 having the hollow portion 17 therein, the mounting bracket (mounting member) 11 attached to the bottom face side of the hollow laminated board 19, and the rivet main body 45 which fastens and attaches the mounting bracket 11 to the bottom face of the hollow laminated board 19.

The hollow laminated board 19 includes the tabular first plate-like member 23 arranged on the bottom face side (the one side), the tabular second plate-like member 25 arranged on the top face side (the other side) with a space provided between the first plate-like member 23 and the second plate-like member 25 in the thickness direction (the height direction), and the middle member 31 which is arranged between the first plate-like member 23 and the second plate-like member 25 to connect the first plate-like member 23 and the second plate-like member 25 to each other and which has the vertical wall portions 27 and 29 extending in the thickness direction of the hollow laminated board 19 and forming the hollow portion 17.

The rivet main body 45 is formed in a tubular shape having the mandrel insertion hole 51 extending in the axial direction, and includes the flange 61 extending in the radial direction and the tubular the sleeve 63 extending in the axial direction from the flange 61.

The blind rivet 41 includes the mandrel 43 inserted and held in the mandrel insertion hole 51 of the rivet main body 45 and the rivet main body 45.

The mandrel 43 has the shaft portion 49 which extends like a rod and which has the easily breakable portion 47 having a locally reduced diameter and being provided at a certain midpoint in the axial direction within the shaft portion 49, the head portion 53 provided at the tip side of the shaft portion 49 and formed to have a larger diameter than the mandrel insertion hole 51, and the protruding portion 55 protruding from the head portion 53 to the tip side of the mandrel 43 by a predetermined length.

The rivet hole 65 which is larger than the diameter of the sleeve 63 of the rivet main body 45 but smaller than the diameter of the flange 61 is formed through each of the bottom face of the hollow laminated board 19 and the mounting bracket 11.

The sleeve 63 of the rivet main body 45 of the blind rivet 41 is inserted into the rivet hole 65 in the bottom face of the hollow laminated board 19 and the mounting bracket 11, and the tip face 55a of the protruding portion 55 of the mandrel 43 is brought into contact with the inside of the face on the top side of the hollow laminated board 19. In this state, the mandrel 43 is pulled to the shaft portion side. As a result, the head portion 53 tears the sleeve 63 of the rivet main body 45 into the sections 71, and these sections 71 spread outward in the radial direction like petals.

During the spreading, the tips 71a of the sections 71 break through the vertical wall portions 27 and 29 of the middle member 31 at the positions between the first plate-like member 23 and the center portions of the vertical wall portions 27 and 29 in the thickness direction, and are fastened to the hollow laminated board 19.

In this embodiment, during the spreading, the tips 71a of the sections 71 come into contact with the vertical wall portions 27 and 29 of the middle member 31 at the positions between the first plate-like member 23 and the center portions of the vertical wall portions 27 and 29 in the thickness direction as shown in FIG. 7. After that, as shown in FIG. 8, the sections 71 break through the vertical wall portions 27 and 29, and are fastened to the hollow laminated board 19. Thus, the mounting bracket 11 is attached to the hollow laminated board 19 by the rivet main body 45.

Here, when the sections 71 break through the vertical wall portions 27 and 29 and are fastened to the hollow laminated board 19, the second plate-like member 25 and the surface member 33 are pulled in toward the first plate-like member 23. However, during the spreading, the sections 71 break through the vertical wall portions 27 and 29 at the positions between the first plate-like member 23 and the center portions of the vertical wall portions 27 and 29 in the height direction. Hence, as shown in FIG. 8, the amount of pulling-in of the second plate-like member 25 and the surface member 33 decreases, so that the appearance is improved.

Figure 10:
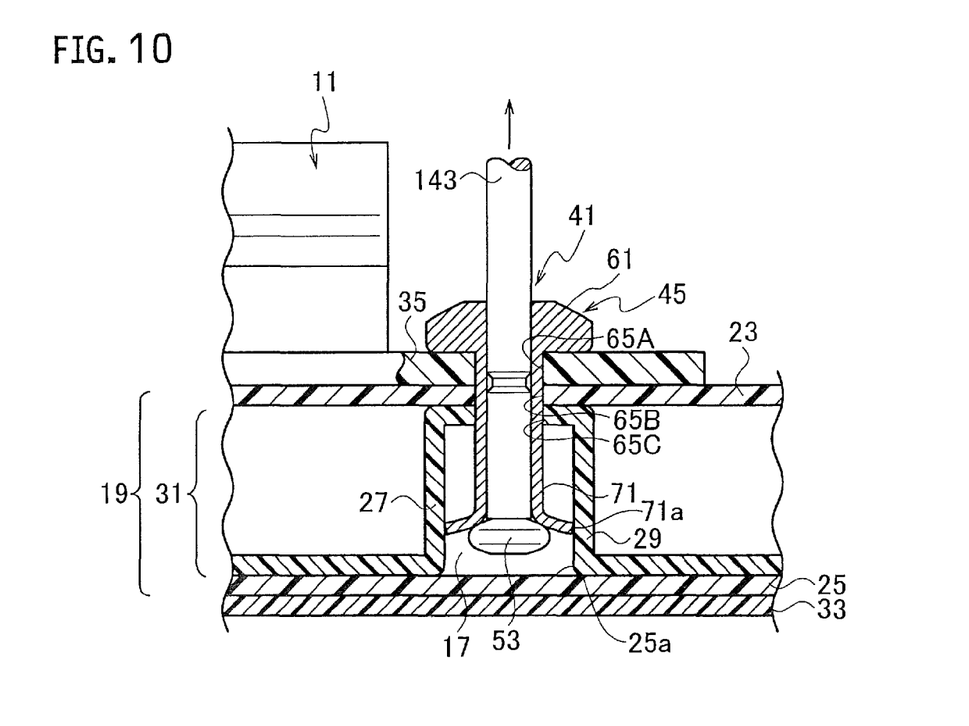
FIG. 10 is a cross-sectional view showing a state where a mandrel in the state shown in FIG. 9 is pulled up.

Note that, as described in FIGS. 9 to 11, in the case where the sections 71 break through the vertical wall portions 27 and 29 at positions between the second plate-like member 25 and the center portions of the vertical wall portions 27 and 29 in the height direction during the spreading, the amount of pulling-in of the second plate-like member 25 and the surface member 33 increases, so that the appearance is deteriorated, as shown in FIG. 11.

The present invention is not limited to the above-described embodiment, and can be modified and altered in various manners on the basis of the technical idea of the present invention. For example, the mounting bracket 11 is attached to the bottom face of the deck board in the embodiment. However, another mounting member may be attached to the top face. Moreover, the hollow laminated board 19 made of a resin is used in this embodiment. However, hollow laminated boards having vertical wall portions, such as corrugated cardboards made of paper and paper honeycombs, may be used. In this manner, any one of various materials such as resins, paper, and metals can be used as the material of the hollow laminated board. In addition, hollow boards having a core member and obtained by blow molding or vacuum molding may also be used.

Specifically, the hollow laminated board 19 can have, for example, any one of the following structures, although these structures are not illustrated:

(1) Corrugated plastic boards having a flute structure monolithically formed by extrusion molding (product name: DANPLATE, SUMIPANEL);

(2) Boards having a structure in which a corrugated sheet is sandwiched between two sheets;

(3) Corrugated plastic boards having a structure in which a sheet formed to have cylinders is sandwiched between two sheets (product name: PLAPEARL, MEITONE);

(4) Four-layer structure corrugated plastic boards in which a structure made of two sheets formed to have circular truncated cones having raised portions with tips welded to each other is sandwiched between two sheets (product name: TWINCORN); and (5) Corrugated plastic boards in which a structure of hexagons formed by shaping and folding an extrusion-molded sheet is sandwiched between two sheets (product name: TECCELL).

What is claimed is:

1. A hollow board comprising:
   a hollow laminated board having a hollow portion therein;
   a mounting member attached to one side of a top side and a bottom side of the hollow laminated board; and
   a rivet main body attaching the mounting member to a face on the one side of the hollow laminated board, wherein
   the hollow laminated board includes
     a tabular first plate shaped member arranged on the one side,
     a tabular second plate shaped member arranged on the other side with a space provided between the first plate shaped member and the second plate shaped member in a thickness direction of the hollow laminated board, and
     a middle member arranged between the first plate shaped member and the second plate shaped member to connect the first plate shaped member and the second plate shaped member to each other and having vertical wall portions extending in the thickness direction of the hollow laminated board and forming the hollow portion,
   the rivet main body is formed in a tubular shape having a mandrel insertion hole extending in an axial direction, and includes a flange extending in a radial direction and a tubular sleeve extending from the flange in the axial direction,
   a blind rivet is formed by the rivet main body and a mandrel inserted and held in the mandrel insertion hole of the rivet main body,
   the mandrel includes
     a shaft portion extending in the form of a rod comprising an easily breakable portion having a locally reduced diameter and being provided at a certain midpoint in the axial direction within the shaft portion,
     a head portion provided at a tip side of the shaft portion and formed to have a larger diameter than the mandrel insertion hole, and
     a protruding portion protruding from the head portion by a predetermined length,
   a rivet hole having a diameter larger than a diameter of the sleeve of the rivet main body but smaller than a diameter of the flange is formed through each of the one side of the hollow laminated board and the mounting member, and
   the mounting member is fastened to the hollow laminated board by the rivet main body in such a manner that
     the sleeve of the rivet main body of the blind rivet is inserted into the rivet holes of the one side of the hollow laminated board and the mounting member,
     a distal end of the protruding portion of the mandrel is brought into a contact state with an inside portion on the other side of the hollow laminated board,
     pulling the mandrel in the contact state to the shaft portion side causes the head portion to tear the sleeve of the rivet main body into sections such that the sections spread outward in the radial direction, and during the spreading, tips of the sections break through the vertical wall portions of the middle member at positions between the first plate shaped member and center portions of the vertical wall portions in the thickness direction, and are fastened to the hollow laminated board.

\* \* \* \* \*